United States Patent
Sreedharan et al.

(10) Patent No.: US 10,713,435 B1
(45) Date of Patent: Jul. 14, 2020

(54) AUTOMATED ANALYSIS, CATEGORIZATION, AND BEHAVIOR PREDICTION OF COMPUTER SCRIPTS USING RULES-BASED PATTERN MATCHING

(71) Applicant: FMR LLC, Boston, MA (US)

(72) Inventors: Romy Sreedharan, Cary, NC (US); Celeste Dupuis, Brookfield, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/412,177

(22) Filed: May 14, 2019

(51) Int. Cl.
*G06F 9/44* (2018.01)
*G06F 40/205* (2020.01)
*G06F 8/41* (2018.01)
*G06K 9/62* (2006.01)
*G06F 40/279* (2020.01)

(52) U.S. Cl.
CPC ............ *G06F 40/205* (2020.01); *G06F 8/433* (2013.01); *G06F 40/279* (2020.01); *G06K 9/6282* (2013.01)

(58) Field of Classification Search
CPC ...... G06F 40/205; G06F 40/279; G06F 8/433; G06K 9/6282
USPC .......................................................... 717/123
See application file for complete search history.

(56) References Cited

U.S. PATENT DOCUMENTS

| | | |
|---|---|---|
| 7,929,767 B2 | 4/2011 | Xu et al. |
| 2008/0320031 A1 | 12/2008 | Denoual |
| 2015/0026038 A1 | 1/2015 | Alsbrooks |
| 2015/0278941 A1 | 10/2015 | Hegarty et al. |
| 2015/0339769 A1 | 11/2015 | deOliveira et al. |
| 2020/0074331 A1* | 3/2020 | Arendt .............. G06K 9/6231 |

* cited by examiner

*Primary Examiner* — Chuck O Kendall
(74) *Attorney, Agent, or Firm* — Proskauer Rose LLP

(57) ABSTRACT

Methods and apparatuses are described for automated analysis, categorization, and behavior prediction of computer scripts using rules-based pattern matching. A server receives from a client device, a request for analysis of a process flow decision. The server identifies computer scripts that execute to generate the process flow decision. For each identified computer script: the server identifies text patterns in the computer script and categorizes the computer script based upon the identified patterns; the server converts the computer script into an expression tree data structure; the server traverses the expression tree to determine logical expressions that return a true result; the server parses each logical expression that returns a true result to identify parameters that contribute to the true result; the server generates a response to the request for analysis of the process flow decision and transmits the response to the request to the client computing device.

20 Claims, 5 Drawing Sheets

There is a 15-day wait period before a loan can be approved from your account. Because your account was funded on March 12, 2019 and the loan was requested on March 18, 2019, the loan cannot be approved at this time.

502

{S:CALLDATE F:SYS} - {S:NONZBLPAYD F:LCT} < 15

AUTOMATED ANALYSIS, CATEGORIZATION, AND BEHAVIOR PREDICTION OF COMPUTER SCRIPTS USING RULES-BASED PATTERN MATCHING

TECHNICAL FIELD

This application relates generally to methods and apparatuses, including computer program products, for automated analysis, categorization, and behavior prediction of computer scripts using rules-based pattern matching.

BACKGROUND

Existing computing systems that are involved in computerized process flows (e.g., transaction flows, decision-making flows) often utilize scripting languages to evaluate rules and conditions surrounding decisions made during the process flows. For example, a legacy computing system may use a scripting language like VB6 or VB.NET to configure and execute script-based rules. Although such customized scripts can provide operational flexibility, the execution of these scripts, and their contribution to the overall outcome of the process flows, is often obscured in backend systems that are not visible to an end user. As a result, the end user is not able to understand the specific conditions or rules that cause a certain outcome of the process flow. In addition, these types of scripts generally consist of complex, nested expressions and operators, along with computer parameter names and variable names, which are not able to be parsed or evaluated in order to determine how the outcome was reached. Many times, these computing systems simply provide the process flow decision to the end user without providing a clear understanding of how the decision was made—resulting in confusion and lack of clarity. Also, due to their monolithic nature, attempts to modify these systems could negatively impact the overall computing ecosystem and put critical enterprise systems at risk of errors or failure.

SUMMARY

Therefore, what is needed are methods and systems that can automatically identify computing scripts that are executed as part of a process flow transaction and that may affect an outcome or decision of the process flow, and parse those computing scripts to determine which specific expressions, sub-expressions, and/or parameters contribute to the evaluation result for the script(s)—which indicates how the process flow decision was made and can be converted into a straightforward textual description of the outcome for transmission to a user. The techniques described herein provide the advantage of generating a tree-based data structure based upon one or more computer script(s) that can be quickly and efficiently traversed to evaluate expressions contained in the computer script(s) and determine both the result of the expressions and their contribution to the outcome of the process flow. The outcome of the computer scripts can then be transformed into an easy-to-understand text description of the rationale behind the process flow decision, for display to a user.

The invention, in one aspect, features a system for automated analysis, categorization, and behavior prediction of computer scripts using rules-based pattern matching. The system comprises a client computing device and a server computing device coupled to the client computing device. The server computing device includes a memory for storing computer-executable instructions and a processor that executes the computer-executable instructions. The server computing device receives, from the client computing device, a request for analysis of a process flow decision. The server computing device identifies one or more computer scripts that execute to generate the process flow decision, each computer script comprising one or more logical expressions, wherein at least one of the logical expressions comprises one or more sub-expressions and the logical expressions and the sub-expressions each comprise one or more parameters that return a true or false result when compared to each other using an operator. For each computer script, the server computing device identifies one or more text patterns in the computer script and categorize the computer script based upon the identified text patterns, converts the computer script into an expression tree data structure, traverses the expression tree data structure to determine one or more of the logical expressions that returns a true result, and parses each logical expression that returns a true result to identify one or more of the parameters of the logical expression that contributes to the true result. The server computing device generates a response to the request for analysis of the process flow decision, the response comprising a description of how the identified parameters of the logical expression contributed to the process flow decision. The server computing device transmits the response to the client computing device.

The invention, in another aspect, features a computerized method of automated analysis, categorization, and behavior prediction of computer scripts using rules-based pattern matching. A server computing device receives, from a client computing device, a request for analysis of a process flow decision. The server computing device identifies one or more computer scripts that execute to generate the process flow decision, each computer script comprising one or more logical expressions, wherein at least one of the logical expressions comprises one or more sub-expressions and the logical expressions and the sub-expressions each comprise one or more parameters that return a true or false result when compared to each other using an operator. For each computer script, the server computing device identifies one or more text patterns in the computer script and categorize the computer script based upon the identified text patterns, converts the computer script into an expression tree data structure, traverses the expression tree data structure to determine one or more of the logical expressions that returns a true result, and parses each logical expression that returns a true result to identify one or more of the parameters of the logical expression that contributes to the true result. The server computing device generates a response to the request for analysis of the process flow decision, the response comprising a description of how the identified parameters of the logical expression contributed to the process flow decision. The server computing device transmits the response to the client computing device.

Any of the above aspects can include one or more of the following features. In some embodiments, identifying one or more text patterns in the computer script comprises comparing one or more of the parameters to a plurality of stored text patterns associated with a category to determine a match. In some embodiments, categorizing the computer script based upon the identified text patterns comprises assigning the category associated with one of the plurality of stored text patterns that matches the one or more parameters. In some embodiments, converting the computer script into an expression tree data structure comprises identifying a logical expression in the computer script as a root expression; generating a root node using the identified root expression; determining one or more logical expressions that depend from the root expression; generating one or more child nodes using the logical expressions that depend from the root expression, where each child node comprises the corresponding one or more parameters and the operator; generating one or more sub-child nodes using the sub-expressions that comprise the logical expressions, wherein each sub-child node comprises the corresponding one or more parameters and the operator; and connecting the root node, the one or more child nodes, and the one or more sub-child nodes in a hierarchical relationship to generate the expression tree data structure.

In some embodiments, traversing the expression tree data structure to determine one or more of the logical expressions that returns a true result comprises, for each child node: retrieving a value for each the one or more parameters that comprise the logical expression; comparing the values for each of the one or more parameters that comprise the logical expression using the operator associated with the logical expression; and determining whether the logical expression returns a true result based upon the comparing step; and for each sub-child node: retrieving a value for each the one or more parameters that comprise the sub-expression; comparing the values for each of the one or more parameters that comprise the sub-expression using the operator associated with the sub-expression; and determining whether the sub-expression returns a true result based upon the comparing step.

In some embodiments, parsing each logical expression that returns a true result to identify one or more of the parameters of the logical expression that contributes to the true result comprises filtering one or more of the parameters of the logical expression based upon the category assigned to the computer script. In some embodiments, generating a response to the request for analysis of the process flow decision comprises: retrieving, from a database, one or more text descriptions associated with the identified parameters of the logical expression that contribute to the true result; and aggregating the one or more text descriptions into a corpus of text that describes how the identified parameters contributed to the process flow decision. In some embodiments, the client computing device displays the description of how the identified parameters of the logical expression contributed to the process flow decision. In some embodiments, the process flow decision is completed and the server computing device identifies a cause of the process flow decision. In some embodiments, the process flow decision is pending and the server computing device predicts an outcome of the process flow decision.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is an exemplary user interface that shows a text description associated with a process flow outcome.

DETAILED DESCRIPTION

Figure 1:
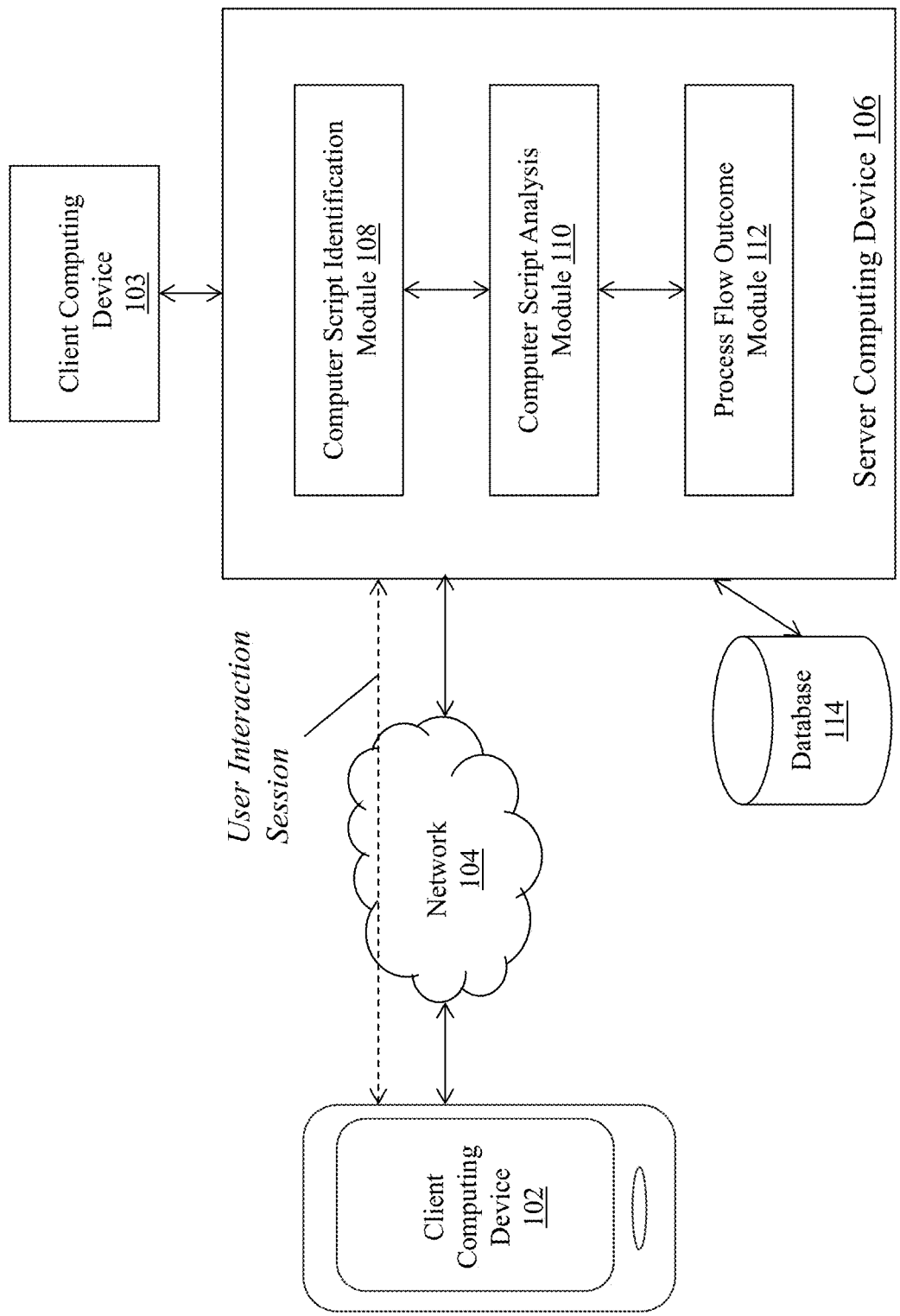
FIG. 1 is a block diagram of a system for automated analysis, categorization, and behavior prediction of computer scripts using rules-based pattern matching.

FIG. 1 is a block diagram of a system 100 for automated predictive analysis of user interactions to determine a modification to one or more features of the user interactions. The system 100 includes a client computing device 102, a client computing device 103, a communications network 104, a server computing device 106 that includes a computer script identification module 108, a computer script analysis module 110, and a process flow outcome module 112, and a database 114.

The client computing device 102 connects to the communications network 104 in order to communicate with the server computing device 106 to provide input and receive output relating to the process of automated analysis, categorization, and behavior prediction of computer scripts using rules-based pattern matching as described herein. Exemplary client computing devices 102 include but are not limited to computing devices such as smartphones, tablets, laptops, desktops, smart watches, IP telephony devices, internet appliances, or other devices capable of establishing a user interaction communication session, such as a voice call or a text chat session, with client computing device 103 via server computing device 106. It should be appreciated that other types of devices that are capable of connecting to the components of the system 100 can be used without departing from the scope of invention.

The client computing device 103 is a computing device coupled to the server computing device 106 (e.g., either directly or via local communication network) and used to establish and participate in user interaction communication sessions that originate from the client computing device 102. In one example, the client computing device 103 is a workstation (e.g., desktop computer, laptop computer, telephony device) of a customer service agent in a call center that enables the agent to receive voice calls and/or text messages from client computing device 102, access information and perform actions using software on the client computing device 103 to provide responses and/or solutions to messages or voice communications submitted by the client device 102. The client computing device 103 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent. In some embodiments, the client computing device 103 is a telephony device that is coupled to a computing device, where the telephony device receives a voice call that originated at the client computing device 102 and is routed through the server computing device 106 as described herein. As can be appreciated, other types of client computing devices 103 that can establish a voice communication session and/or text-based communication session with the server computing device 106 and/or the client computing device 102 are within the scope of invention.

In some embodiments, the client computing device 103 can comprise an automated software program (e.g., a chat bot, an interactive voice response (IVR) platform) that receives user interactions from client device 102 and responds to the user interactions. In these embodiments, an actual customer service agent is not required to control or monitor the client device 103; instead, the software program is configured to participate in a communication session with a user at client device 102 automatically. For example, a user at client computing device 102 can establish a communication session with client computing device 103 via server computing device 106 by, e.g., opening a chat window in browser software that connects to the server computing device 106—which interfaces with client computing device 103 to automatically respond to text messages provided from client device 102. Other types of automated response systems can be utilized within the scope of invention described herein.

The communications network 104 enables the client computing device 102 to communicate with the server computing device 106 and the client computing device 103. The network 104 is typically a wide area network, such as the Internet and/or a cellular network. In some embodiments, the network 104 is comprised of several discrete networks and/or sub-networks (e.g., cellular to Internet, PSTN to Internet, PSTN to cellular, etc.).

The server computing device 106 a device including specialized hardware and/or software modules that execute on a processor and interact with memory modules of the server computing device 106, to receive data from other components of the system 100, transmit data to other components of the system 100, and perform functions for automated predictive analysis of user interactions to determine a modification to one or more features of the user interactions as described herein. The server computing device 106 includes several computing modules 108, 110, 112 that execute on one or more processors of the server computing device 106. In some embodiments, the modules 108, 110, 112 are specialized sets of computer software instructions programmed onto one or more dedicated processors in the server computing device 106 and can include specifically-designated memory locations and/or registers for executing the specialized computer software instructions.

Although the computing modules 108, 110, 112 are shown in FIG. 1 as executing within the same server computing device 106, in some embodiments the functionality of the modules 108, 110, 112 can be distributed among a plurality of server computing devices. As shown in FIG. 1, the server computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the computing modules 108, 110, 112 is described in detail below.

The database 114 is a computing device (or in some embodiments, a set of computing devices) coupled to the server computing device 106 and is configured to receive, generate, and store specific segments of data relating to the process of automated predictive analysis of user interactions to determine a modification to one or more features of the user interactions as described herein. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below. An exemplary database 114 is MySQL™ available from Oracle Corp. of Redwood City, Calif.

Figure 2:
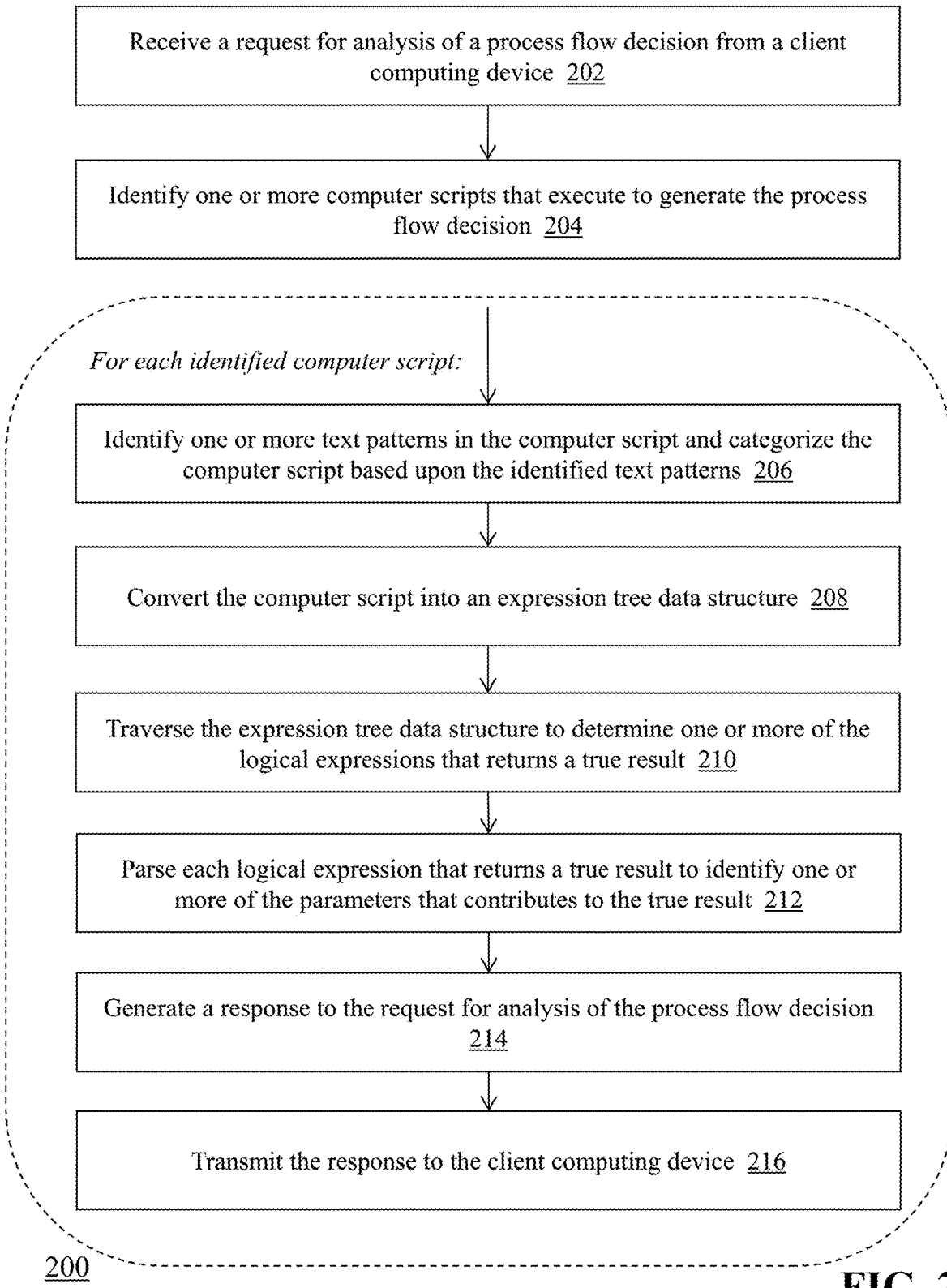
FIG. 2 is a flow diagram of a computerized method for automated analysis, categorization, and behavior prediction of computer scripts using rules-based pattern matching.

FIG. 2 is a flow diagram of a computerized method 200 automated analysis, categorization, and behavior prediction of computer scripts using rules-based pattern matching, using the system 100 of FIG. 1. The client computing device 102 initiates a communication session (e.g., voice call, text chat session) via communications network 104 to, e.g., server computing device 106. For example, a user at client computing device 102 can launch a telephony application (for voice) or a chat application/browser window (for text chat), which establishes a connection to server computing device 106. The server computing device 106 can route the communication session to client computing device 103 (e.g., a workstation of a customer service agent, an automated IVR or chat bot module, etc.) to participate in the communication session with the client computing device 102.

As part of the communication session, the user of client computing device 102 may ask for advice or explanation relating to a process flow decision that is associated with the user of client device 102. In one example, a user may contact a customer service representative of a company or other institution (e.g., a bank, financial services company, life insurance company, credit card company, consumer goods retailer) with which the user of client device has previously submitted an application, order, or request for products or services. For example, the user of client device 102 may have submitted a request for a loan from his or her retirement account (e.g., 401k) and the user is now contacting his or her employer, or the financial entity that manages the retirement account, to determine the status of the loan request. In the context of this disclosure, the loan request process can be considered a 'process flow' for which the outcome (i.e., the decision whether or not to approve the user's loan) is considered a 'process flow decision.' It should be appreciated that a wide variety of other types of process flows and related decisions can be contemplated without departing from the scope of invention described herein.

Generally, computing systems operated by the process flow decision-maker utilize one or more computer scripts to automate the decision-making process. For example, when the user of client device 102 submitted his or her loan request (e.g., via web-based form, telephone call, chat session, or the like), one or more computing systems of the process flow decision-maker capture information relevant to the loan request in electronic form, and submit the electronic information to a computerized decision-making system that executes one or more computer scripts against the electronic information to determine, e.g., whether to approve the loan request, whether to deny the loan request, or whether more information is needed before a final decision can be made. Typically, such computer scripts are comprised of one or more logical expressions, at least one of which includes one or more sub-expressions with one or more parameters that, when evaluated using an operator, return a true result or a false result. In these types of computer scripts, the process flow decision may be determined by a single one of the parameters, multiple parameters, and/or one or more of the sub-expressions. In order to determine which portion(s) of the computer script are responsible for generating the true result or the false result, the computer script must be analyzed using the techniques described herein.

Upon receiving the user's request for advice or explanation, a user at client computing device 103 (e.g., a CSR) submits an electronic request to server computing device 106 for analysis of a process flow decision associated with the client device 102 user's request. Using the above example, a CSR at client device 103 can view a process flow decision on a display coupled to the client device 103 (e.g., the user's loan request was denied), select the process flow decision, and execute an analysis command that issues a request for analysis of the process flow decision to server computing device 106. The computer script identification module 108 of server computing device 106 receives (202) the request for analysis of the process flow decision. In some embodiments, the request for analysis of the process flow decision includes an identifier associated with the process flow decision and/or one or more process flow(s) associated with the process flow decision. In some embodiments, the request for analysis of the process flow decision includes an identifier associated with the user of client device 102.

Figure 3:
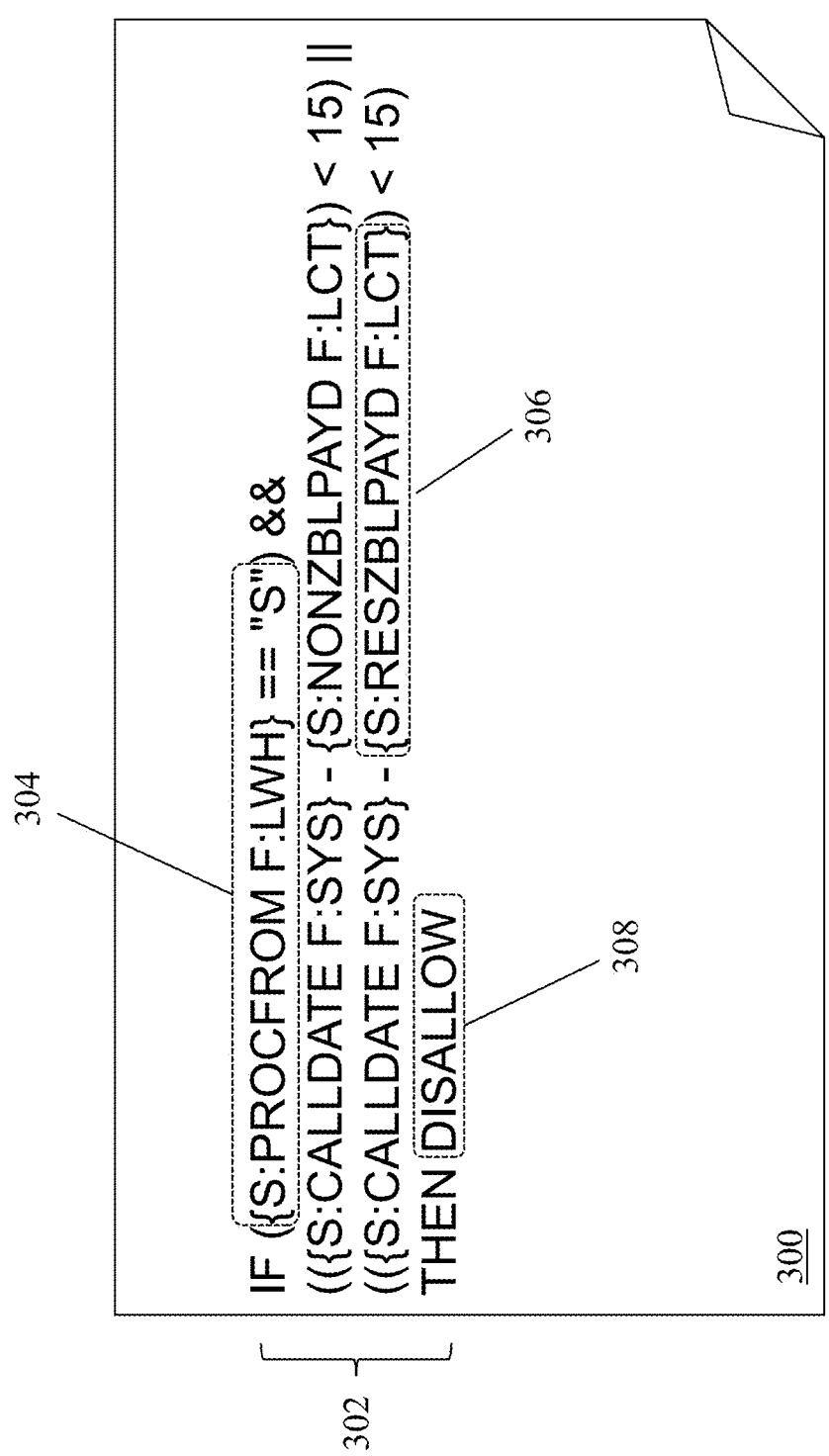
FIG. 3 is an exemplary computer script.

Upon receiving the request, the computer script identification module 108 identifies (204) one or more computer scripts that execute (or in some cases, have already been executed) to generate the process flow decision. As noted above, each computer script comprises one or more logical expressions, where at least one of the logical expressions comprises one or more sub-expressions. Further, the logical expressions and/or the sub-expressions each comprise one or more parameters that return a true or false result when compared to each other using an operator. FIG. 3 is an exemplary computer script 300. As shown in FIG. 3, the computer script 300 includes a logical expression 302 that, if true, returns a process flow decision 308 (e.g., DISALLOW):

IF({S:PROCFROM==F:LWH} "S")&&(({S:CALLDATE F:SYS}-{S:NONZBLPAYD F:LCT})<15)
∥(({S:CALLDATE F:SYS}-{S:RESZBLPAYD F:LCT})<15)THEN DISALLOW

The logical expression 302 includes a plurality of sub-expressions (e.g., sub-expression 304):

{S:PROCFROM F:LWH}=="S")

(({S:CALLDATE F:SYS}-{S:NONZBLPAYD F:LCT})<15)∥(({S:CALLDATE F:SYS}-{S:RESZBLPAYD F:LCT})<15))

In addition, the second sub-expression shown above can be separated into further sub-expression(s):

{S:CALLDATE F:SYS}-{S:NONZBLPAYD F:LCT})
<15

{S:CALLDATE F:SYS}-{S:RESZBLPAYD F:LCT})
<15

Each of the sub-expressions can include one or more parameters 306 (e.g.: 'S:RESZBLPAYD F:LCT') that are separated by an operator (e.g., =, <, >, &&, ∥, and the like). For example, the sub-expression {S:CALLDATE F:SYS}-{S:RESZBLPAYD F:LCT})<15 comprises three parameters: S:CALLDATE F:SYS; S:RESZBLPAYD F:LCT; and 15. The two parameters S:CALLDATE F:SYS and S:RESZBLPAYD F:LCT are variables that relate to user-specific and/or loan request-specific data, while the third parameter '15' is a constant. In addition, a parameter of a sub-expression can comprises another sub-expression with its own parameters (e.g., a nested equation or expression).

Turning back to FIG. 2, the computer script identification module 108 identifies (204) one or more computer scripts that execute to generate the process flow decision by, e.g., retrieving an identifier associated with the computer scripts from database 114. For example, the database 114 can include a mapping table that associates the process flow decision (or metadata associated with the process flow decision) to one or more computer script identifiers, and the computer script identification module 108 accesses (or generates) the code for the computer scripts (e.g., as shown in FIG. 3) based upon the retrieved identifiers.

The computer script identification module 108 transfers the computer script code to the computer script analysis module 110. For each identified computer script, the computer script analysis module 110 performs several steps to determine which sub-expression(s) and/or parameter(s) in the computer script contributed to the true result or the false result returned in the process flow decision.

The computer script analysis module 110 identifies (206) one or more text patterns in the computer script and categorizes the computer script based upon the identified text patterns. Using the example script 300 of FIG. 3, the computer script analysis module 110 identifies the text pattern of "S:PROCFROM F:LWH" in the script and determines that the script is categorized as a "Loan Wait Hold" script—indicating that denial of the client device 102 user's loan request is associated with a loan wait hold. In some embodiments, the computer script analysis module 110 compares the identified text pattern to a plurality of text patterns stored in database 114 that are associated with a particular category to determine a match. For example, the database 114 can comprise a lookup table that associates a series of different script categories with each of a plurality of text patterns (e.g., variable names, sub-expressions, etc.) and the computer script analysis module 110 can retrieve one or more applicable categories from the lookup table based upon the identified one or more text patterns and assign the applicable categories to the computer script.

Figure 4:
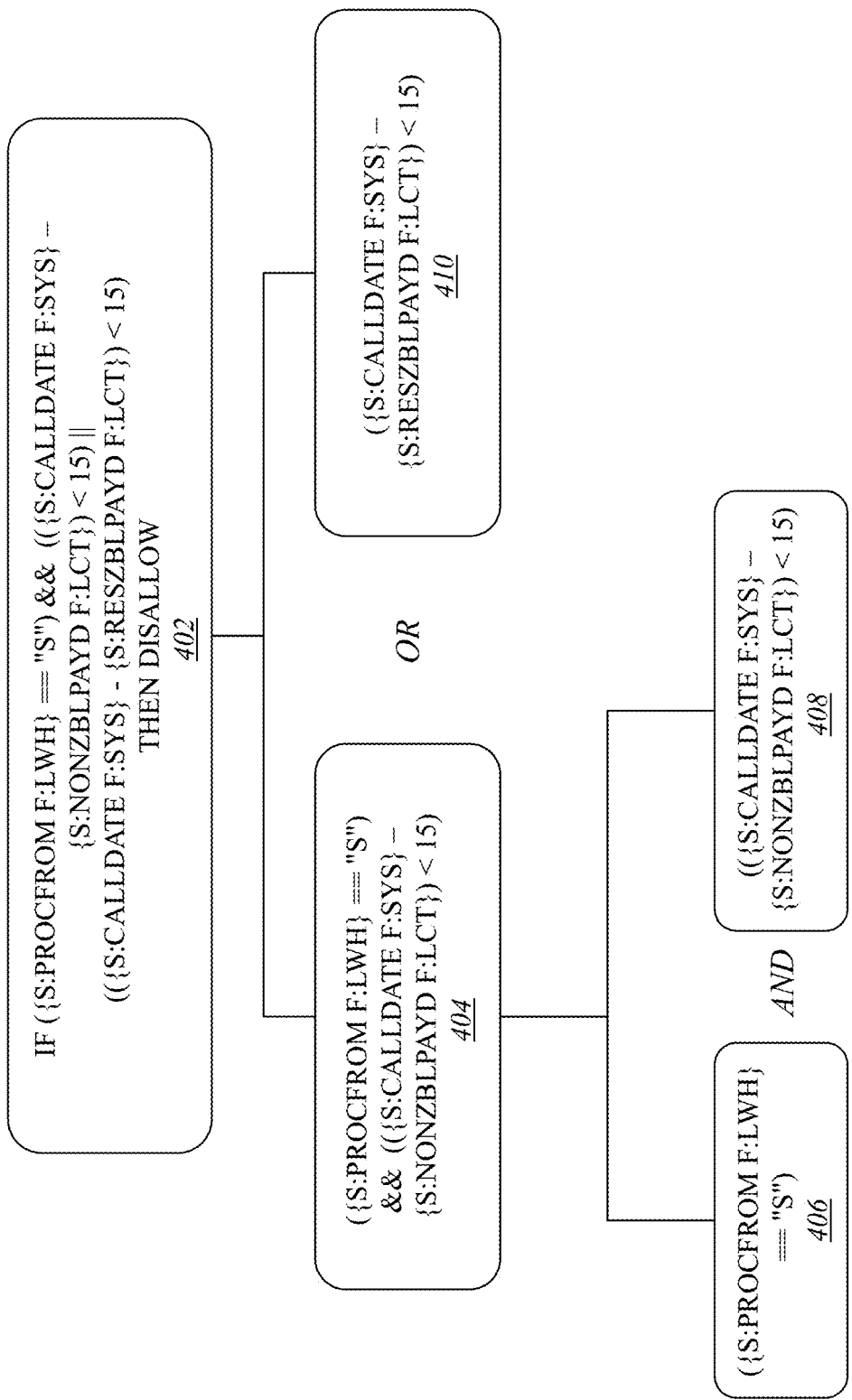
FIG. 4 is an exemplary expression tree data structure converted from the script of FIG. 3.

In order to determine the exact conditions that resulted in the loan wait hold process flow decision, the computer script analysis module 110 continues its analysis of the computer script by converting (208) the computer script into an expression tree data structure. FIG. 4 is an exemplary expression tree data structure 400 converted from the script 300 of FIG. 3. As shown in FIG. 4, the expression tree data structure 400 comprises the sub-expressions and parameters of the script 300 separated into nodes of the expression tree with hierarchical parent-child relationships. For example, the logical expression from the script is defined as the root node 402 in the expression tree data structure. The logical expression is then separated using the OR operator (∥) into two sub-expressions, and each of the sub-expressions is defined in the expression tree data structure as a child node 404, 410, respectively, to the logical expression 402. Because the sub-expression in node 404 can be separated further, the computer script analysis module 110 separates the sub-expression using the AND operator (&&) into two additional sub-expressions, defined in the expression tree data structure as nodes 406 and 408, respectively.

Next, the computer script analysis module 110 traverses (210) the generated expression tree data structure to determine one or more of the logical expressions or sub-expressions that returns a true result—indicating that the logical expression or sub-expression caused the process flow decision outcome. Using the example from FIG. 4, the computer script analysis module 110 traverses each node of the expression tree data structure 400 by analyzing the result returned by evaluating the sub-expressions in nodes 404 and 410. In this example, the result returned by evaluating the sub-expression in node 404 is TRUE, while the result returned by evaluating the sub-expression in node 410 is FALSE. Because the overall logical expression 402 is an IF-THEN statement, the computer script analysis module 110 determines that the sub-expression in node 410 did not contribute to the process flow decision and therefore, does not need to be further considered. For example, if the node 410 had one or more child nodes, the computer script analysis module 110 would not need to traverse those nodes—thereby making the traversal process computationally faster and more efficient.

The computer script analysis module 110 then evaluates the sub-expressions in nodes 406 and 408 to determine whether one or both of the sub-expressions returns a true result. Because the computer script analysis module 110 previously identified the variable S:PROCFROM F:LWH in the sub-expression of node 406 to categorize the overall expression as a Loan Wait Hold, the computer script analysis module 110 can eliminate node 406 from further consideration (even though the sub-expression does return a true result).

Next, the computer script analysis module 110 evaluates the sub-expression in node 408. For example, the variable {S:CALLDATE F:SYS} can indicate the current date on which the client device 102 user had originally requested the loan and the variable {S:NONZBLPAYD F:LCT} can indicate, e.g., a date on which the 401k account (from which the loan is requested) was funded. The financial services entity that manages the account (and/or the employer that offers the account) may have specific restrictions on when a loan can be taken, or how long funds must be in the account before the funds can be loaned out. The computer script analysis module 110 can retrieve values from database 114 to insert into these variables using, e.g., the metadata supplied in the request received at step 202 and then evaluate the sub-expression. Using this example, the computer script analysis module 110 would evaluate the sub-expression as follows:

{S:CALLDATE F:SYS}-{S:NONZBLPAYD F:LCT}<15

↓

{S:CALLDATE F:SYS}=03/18/2019; {S:NONZBLPAYD F:LCT}=03/12/2019

↓

{03/18/2019}-{3/12/2019}<15

↓

{03/18/2019}-{3/12/2019}<15

↓

6<15=TRUE

Therefore, because the funds were deposited into the 401k account less than 15 days before the loan request was submitted, the sub-expression is TRUE.

The computer script analysis module 110 captures the sub-expression in node 408 and parses (212) the sub-expression to identify one or more of the parameters of the sub-expression (or logical expression) that contributes to the true result. In this instance, the computer script analysis module 110 identifies the parameters of the left-hand side of the sub-expression (i.e., {S:CALLDATE F:SYS}-{S:NONZBLPAYD F:LCT}) and the parameter of the right-hand side of the sub-expression as contributing to the true result. The computer script analysis module 110 transfers the identified parameters and their corresponding values to the process flow outcome module 112.

The process flow outcome module 112 generates (214) a response to the request for analysis of the process flow decision previously submitted by client computing device 103, using the identified parameters. In some embodiments, the process flow outcome module 112 can use one or more of the identified parameters to search database 114 for, e.g., a text description or template of how the identified parameters of the sub-expression (or logical expression) contributed to the process flow decision. For example, the process flow outcome module 112 can search a table in database 114 using the identified parameters {S:CALLDATE F:SYS}, {S:NONZBLPAYD F:LCT}, and/or '15' to retrieve a text description that includes one or more of those parameters, e.g.:

"There is a 15-day wait period before a loan can be approved from your account. Because your account was funded on {S:NONZBLPAYD F:LCT} and the loan was requested on {S:CALLDATE F:SYS}, the loan cannot be approved at this time."

In some embodiments, the process flow outcome module 112 can retrieve a plurality of text descriptions from the database 114 based on, e.g., different identified parameters and aggregate the plurality of text descriptions into a single corpus of text that comprises a full description.

The process flow outcome module 112 uses the text description retrieved from database 114 along with the values for the identified parameters to generate a completed text description that explains the process flow decision based upon the computer script expressions used to make the decision. The process flow outcome module 112 then transmits (216) the response—including the text description—to the client computing device 103.

The client computing device 103 can display the text description received from the server computing device 106, e.g., on a display device coupled to the client device 103 (such as a screen viewed by the CSR). FIG. 5 is an exemplary user interface 500 of the client computing device 103 that shows the text description associated with the process flow outcome. As shown in FIG. 5, the user interface 500 includes a message area 502 that shows the sub-expression which contributed to the TRUE result (in this case, denial of a loan request) and message area 504 displays the corresponding text description generated by the process flow outcome module 112. The CSR can quickly and easily review the text description and relay its contents to the user at client computing device 102.

In some embodiments, the techniques described herein can be used to predict the outcome of a particular process flow as embodied by one or more computer scripts. Using the above example, the user at client device 102 can log into a website provided by the financial services entity that manages his 401k account and submit a request for a loan from the account. While the loan request is being processed, the computing system that is processing the request can establish a connection with server computing device 106 and issue a request for prediction of a process flow decision, that operates in a similar fashion as the request for analysis of a process flow decision as described above. The server computing device 106 can capture and retrieve relevant information associated with the loan request and evaluate one or more computer scripts that are involved in the process flow decision-making, as described previously, to determine whether a true result would occur if those script(s) were executed as part of the process flow. A difference here is that, in this instance, the denial of the loan request has not yet been made. However, the server computing device 106 can still determine the type of result (e.g., true, false) that the computing script(s) would generate if executed and utilize the computer scripts to predict a process flow outcome based upon the available data. Upon analyzing the computer script(s) and predicting what the process flow decision would be, the server computing device 106 can generate a text description based upon the predicted decision and transmit the text description back to the client computing device 102 for, e.g., display to the user. In this way, the system 100 can operate as a real-time notification system that instructs users directly as to whether a specific order or request will be approved or denied.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated analysis, categorization, and behavior prediction of computer scripts using rules-based pattern matching, the system comprising:
   a client computing device;
   a server computing device coupled to the client computing device, the server computing device having a memory for storing computer-executable instructions and a processor that executes the computer-executable instructions to:
   receive, from the client computing device, a request for analysis of a process flow decision;
   identify one or more computer scripts that execute to generate the process flow decision, each computer script comprising one or more logical expressions, wherein at least one of the logical expressions comprises one or more sub-expressions and the logical expressions and the sub-expressions each comprise one or more parameters that return a true or false result when compared to each other using an operator;
   for each identified computer script:
   identify one or more text patterns in the computer script and categorize the computer script based upon the identified text patterns;
   convert the computer script into an expression tree data structure;
   traverse the expression tree data structure to determine one or more of the logical expressions that returns a true result;
   parse each logical expression that returns a true result to identify one or more of the parameters of the logical expression that contributes to the true result;
   generate a response to the request for analysis of the process flow decision, the response comprising a description of how the identified parameters of the logical expression contributed to the process flow decision; and
   transmit the response to the request for analysis of the process flow decision to the client computing device.

2. The system of claim 1, wherein identifying one or more text patterns in the computer script comprises comparing one or more of the parameters to a plurality of stored text patterns associated with a category to determine a match.

3. The system of claim 2, wherein categorizing the computer script based upon the identified text patterns comprises assigning the category associated with one of the plurality of stored text patterns that matches the one or more parameters.

4. The system of claim 1, wherein converting the computer script into an expression tree data structure comprises:
   identifying a logical expression in the computer script as a root expression;
   generating a root node using the identified root expression;
   determining one or more logical expressions that depend from the root expression;
   generating one or more child nodes using the logical expressions that depend from the root expression, wherein each child node comprises the corresponding one or more parameters and the operator;
   generating one or more sub-child nodes using the sub-expressions that comprise the logical expressions, wherein each sub-child node comprises the corresponding one or more parameters and the operator; and
   connecting the root node, the one or more child nodes, and the one or more sub-child nodes in a hierarchical relationship to generate the expression tree data structure.

5. The system of claim 4, wherein traversing the expression tree data structure to determine one or more of the logical expressions that returns a true result comprises,
   for each child node:
   retrieving a value for each the one or more parameters that comprise the logical expression;
   comparing the values for each of the one or more parameters that comprise the logical expression using the operator associated with the logical expression; and
   determining whether the logical expression returns a true result based upon the comparing step; and
   for each sub-child node:
   retrieving a value for each the one or more parameters that comprise the sub-expression;
   comparing the values for each of the one or more parameters that comprise the sub-expression using the operator associated with the sub-expression; and
   determining whether the sub-expression returns a true result based upon the comparing step.

6. The system of claim 1, wherein parsing each logical expression that returns a true result to identify one or more of the parameters of the logical expression that contributes to the true result comprises filtering one or more of the parameters of the logical expression based upon the category assigned to the computer script.

7. The system of claim 1, wherein generating a response to the request for analysis of the process flow decision comprises:
   retrieving, from a database, one or more text descriptions associated with the identified parameters of the logical expression that contribute to the true result; and aggregating the one or more text descriptions into a corpus of text that describes how the identified parameters contributed to the process flow decision.

8. The system of claim 1, wherein the client computing device displays the description of how the identified parameters of the logical expression contributed to the process flow decision.

9. The system of claim 1, wherein the process flow decision is completed and the server computing device identifies a cause of the process flow decision.

10. The system of claim 1, wherein the process flow decision is pending and the server computing device predicts an outcome of the process flow decision.

11. A computerized method of automated analysis, categorization, and behavior prediction of computer scripts using rules-based pattern matching, the method comprising:
receiving, by a server computing device, a request for analysis of a process flow decision from a client computing device;
identifying, by the server computing device, one or more computer scripts that execute to generate the process flow decision, each computer script comprising one or more logical expressions, wherein at least one of the logical expressions comprises one or more sub-expressions and the logical expressions and the sub-expressions each comprise one or more parameters that return a true or false result when compared to each other using an operator;
for each identified computer script:
identifying, by the server computing device, one or more text patterns in the computer script and categorize the computer script based upon the identified text patterns;
converting, by the server computing device, the computer script into an expression tree data structure;
traversing, by the server computing device, the expression tree data structure to determine one or more of the logical expressions that returns a true result;
parsing, by the server computing device, each logical expression that returns a true result to identify one or more of the parameters of the logical expression that contributes to the true result;
generating, by the server computing device, a response to the request for analysis of the process flow decision, the response comprising a description of how the identified parameters of the logical expression contributed to the process flow decision; and
transmitting, by the server computing device, the response to the request for analysis of the process flow decision to the client computing device.

12. The method of claim 11, wherein identifying one or more text patterns in the computer script comprises comparing one or more of the parameters to a plurality of stored text patterns associated with a category to determine a match.

13. The method of claim 12, wherein categorizing the computer script based upon the identified text patterns comprises assigning the category associated with one of the plurality of stored text patterns that matches the one or more parameters.

14. The method of claim 11, wherein converting the computer script into an expression tree data structure comprises:

identifying a logical expression in the computer script as a root expression;
generating a root node using the identified root expression;
determining one or more logical expressions that depend from the root expression;
generating one or more child nodes using the logical expressions that depend from the root expression, wherein each child node comprises the corresponding one or more parameters and the operator;
generating one or more sub-child nodes using the sub-expressions that comprise the logical expressions, wherein each sub-child node comprises the corresponding one or more parameters and the operator; and
connecting the root node, the one or more child nodes, and the one or more sub-child nodes in a hierarchical relationship to generate the expression tree data structure.

15. The method of claim 14, wherein traversing the expression tree data structure to determine one or more of the logical expressions that returns a true result comprises, for each child node:
retrieving a value for each the one or more parameters that comprise the logical expression;
comparing the values for each of the one or more parameters that comprise the logical expression using the operator associated with the logical expression; and
determining whether the logical expression returns a true result based upon the comparing step; and
for each sub-child node:
retrieving a value for each the one or more parameters that comprise the sub-expression;
comparing the values for each of the one or more parameters that comprise the sub-expression using the operator associated with the sub-expression; and
determining whether the sub-expression returns a true result based upon the comparing step.

16. The method of claim 11, wherein parsing each logical expression that returns a true result to identify one or more of the parameters of the logical expression that contributes to the true result comprises filtering one or more of the parameters of the logical expression based upon the category assigned to the computer script.

17. The method of claim 11, wherein generating a response to the request for analysis of the process flow decision comprises:
retrieving, from a database, one or more text descriptions associated with the identified parameters of the logical expression that contribute to the true result; and
aggregating the one or more text descriptions into a corpus of text that describes how the identified parameters contributed to the process flow decision.

18. The method of claim 11, wherein the client computing device displays the description of how the identified parameters of the logical expression contributed to the process flow decision.

19. The method of claim 11, wherein the process flow decision is completed and the server computing device identifies a cause of the process flow decision.

20. The method of claim 11, wherein the process flow decision is pending and the server computing device predicts an outcome of the process flow decision.

* * * * *